United States Patent
Werkheiser et al.

(10) Patent No.: US 10,591,977 B2
(45) Date of Patent: Mar. 17, 2020

(54) SEGREGATED POWER STATE CONTROL IN A DISTRIBUTED CACHE SYSTEM

(71) Applicant: ARM Limited, Cambridge (GB)

(72) Inventors: Mark David Werkheiser, Austin, TX (US); Dominic William Brown, Ely (GB); Ashley John Crawford, Ashdon (GB); Paul Gilbert Meyer, Rollingwood, TX (US)

(73) Assignee: Arm Limited, Cambridge (GB)

( * ) Notice: Subject to any disclaimer, the term of this patent is extended or adjusted under 35 U.S.C. 154(b) by 546 days.

(21) Appl. No.: 14/965,184

(22) Filed: Dec. 10, 2015

(65) Prior Publication Data
US 2017/0168548 A1    Jun. 15, 2017

(51) Int. Cl.
| G06F 1/32 | (2019.01) |
| G06F 1/3234 | (2019.01) |
| G06F 12/0813 | (2016.01) |
| G06F 12/0831 | (2016.01) |

(52) U.S. Cl.
CPC ........ G06F 1/3275 (2013.01); G06F 12/0813 (2013.01); *G06F 12/0831* (2013.01); *G06F 2212/1028* (2013.01); *Y02D 10/13* (2018.01); *Y02D 10/14* (2018.01)

(58) Field of Classification Search
CPC ...................................... G06F 1/26; G06F 1/00
USPC ....... 713/300, 310, 320, 321, 322, 323, 324, 713/330, 340, 275
See application file for complete search history.

(56) References Cited

U.S. PATENT DOCUMENTS

| 6,993,633 | B1* | 1/2006 | Sakakibara | G06F 12/084 |
| | | | | 711/119 |
| 8,725,953 | B2 | 5/2014 | Paver et al. | |
| 8,949,547 | B2 | 2/2015 | Mannava et al. | |
| 2004/0230861 | A1* | 11/2004 | Bailey | G06F 11/0712 |
| | | | | 714/6.12 |
| 2008/0104324 | A1* | 5/2008 | Raghuvanshi | G06F 12/0802 |
| | | | | 711/122 |
| 2008/0162958 | A1* | 7/2008 | Bozek | G06F 1/3209 |
| | | | | 713/310 |
| 2010/0185821 | A1 | 7/2010 | Paver et al. | |
| 2010/0241777 | A1 | 9/2010 | Kocherry et al. | |
| 2011/0219206 | A1* | 9/2011 | Tan | G06F 12/10 |
| | | | | 711/209 |
| 2011/0271126 | A1 | 11/2011 | Hill | |
| 2013/0036270 | A1 | 2/2013 | Dreslinski et al. | |
| 2013/0042034 | A1 | 2/2013 | Mannava et al. | |
| 2013/0042070 | A1 | 2/2013 | Jalal et al. | |
| 2013/0042077 | A1 | 2/2013 | Mannava et al. | |
| 2013/0042252 | A1 | 2/2013 | Jalal et al. | |
| 2013/0073878 | A1* | 3/2013 | Jayasimha | G06F 1/3287 |
| | | | | 713/300 |
| 2014/0149653 | A1 | 5/2014 | Udipi et al. | |

(Continued)

*Primary Examiner* — Jaweed A Abbaszadeh
*Assistant Examiner* — Keshab R Pandey
(74) *Attorney, Agent, or Firm* — Leveque IP Law, P.C.

(57) ABSTRACT

A method, system, and device provide for selective control in a distributed cache system of the power state of a number of receiver partitions arranged in one or more partition groups. A power control element coupled to one or more of the receiver partitions and a coherent interconnect selectively control transition from a current power state to a new power state by each receiver partition of one or more partition groups of the plurality of partition groups.

19 Claims, 5 Drawing Sheets

(56) References Cited

U.S. PATENT DOCUMENTS

2015/0067269 A1* 3/2015 Wang ................. G06F 12/0822
                                                    711/141
2015/0346795 A1* 12/2015 Shacham ............... G06F 1/266
                                                    713/324
2017/0010655 A1* 1/2017 Kanchana ............. G06F 1/3275

* cited by examiner

SEGREGATED POWER STATE CONTROL IN A DISTRIBUTED CACHE SYSTEM

BACKGROUND

In a cache coherent network (CCN), hardware interfaces may be used to globally control power domains of all cache partitions in the network. This global approach is not feasible when a number of address domain regions are introduced, since each region will have its own power domain requirements. Moreover, interconnect implementations for a CCN that use hardware control for each cache partition becomes unmanageable at the System-on-Chip (SOC) level, as the number of cache partitions can be quite high.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
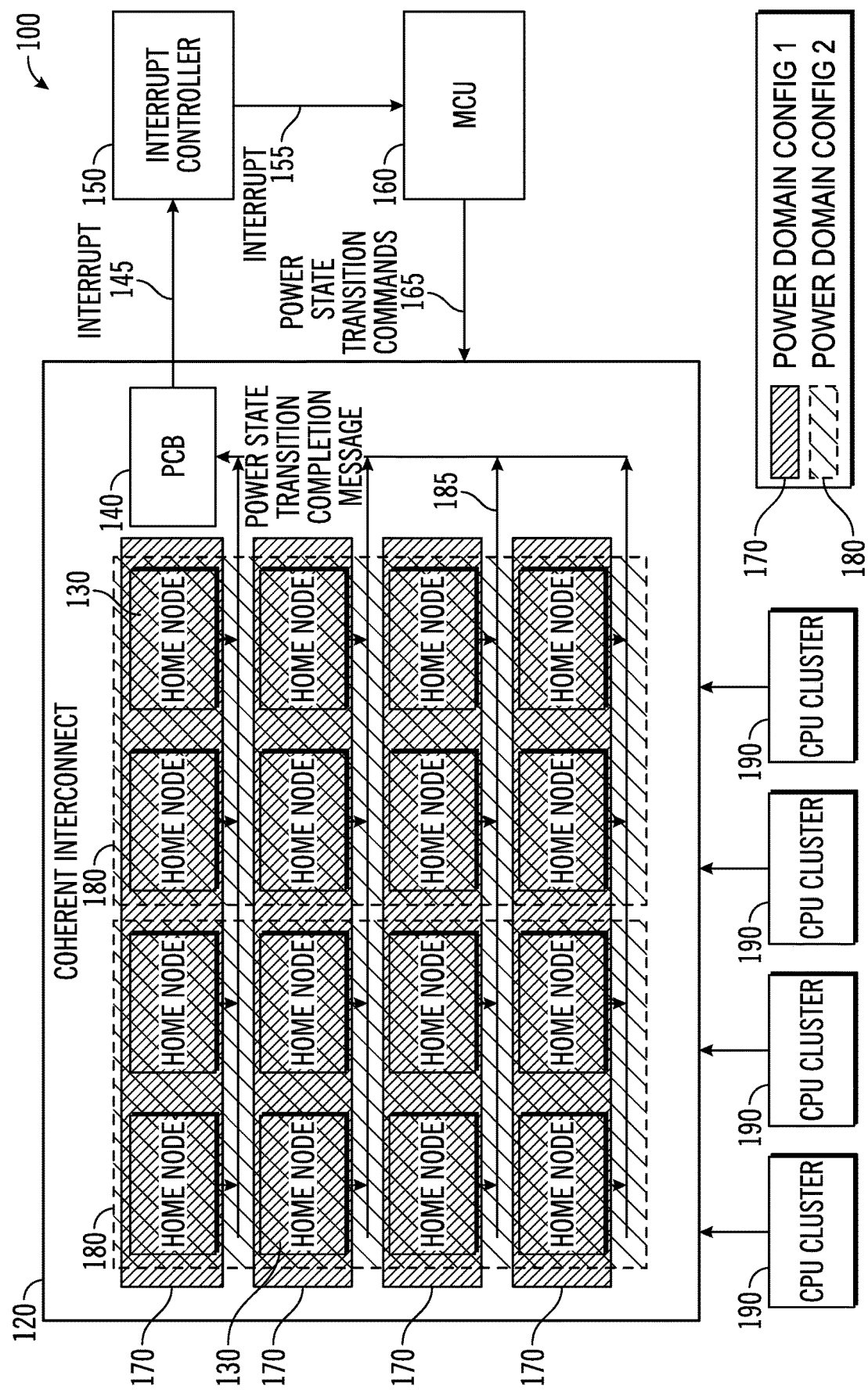
FIG. 1 is a block diagram of a distributed cache system in which two example power domain configurations are illustrated, in accordance with various representative embodiments.

The various methods, systems, apparatus, and devices described herein provide for selective control of the power domains associated with address domain regions.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In accordance with various embodiments disclosed herein, a number of individual, addressable receiver partitions may be grouped in one or more partition groups (address domain regions, such as non-uniform memory access (NUMA) regions) that provide addressable memory access. The power domain of such partition groups, or even of individual receiver partitions, can be selectively changed in order to manage and control power consumption of a cache coherency system. Embodiments disclosed enable individual and selective power domain control for each partition group, and even power control of individual receiver partitions, through a combination of hardware and software mechanisms. The power interface of respective partition groups may be controlled by software present on a microcontroller (MCU), which knows how the respective HN partitions are grouped within partition groups. The number of partition groups may be two or more depending on the particular architecture of a SoC and the groupings of receiver partitions within partition groups may be configurable.

As used herein, the term sender or senders may refer to request nodes or requesters (RNs), initiator devices, sources or other transaction generating devices that stream transaction requests over an interconnect circuit or structure to one or more receivers or receiver partitions. As any device that generates transactions and requests, then, a sender could be a master or initiator device in a data processing system, such as a data processor, a graphics engine, a graphics post processor (GPP), a processing element or core, clusters of processing cores, input/output (I/O) masters, a digital signal processor (DSP), a field programmable gate array (FPGA) or an application specific integrated circuit (ASIC) device, by way of example and not limitation. Moreover, transaction requests may be generated by a sender, or received by a sender from another device and then transmitted via the interconnect to a receiver. A receiver may be any device, such as a home node (HN) or target, which receives and executes transaction requests. As such, a receiver may be an intermediate device such as a coherency controller or another interconnect that receives a transaction request, or it may be the final destination of a transaction request. A transaction request may be a request by a sender for a Receiver to update the state of a resource by the receiver; examples of transaction requests include memory read or write requests, such as ordered writes, ordered reads, and invalidate requests, and requests to access memory-mapped peripheral devices. A "resource", "data resource", "buffer resource" or the like can be accessed by multiple devices and has associated with it a state that can be updated or changed. Examples of a resource include a byte of memory, a bit in a register, etc.

Various types of RNs that may be employed in a cache coherent network (CCN) include fully coherent Requesting Nodes (RN-Fs) as well as IO coherent Request Nodes (RN-Is). Examples of RN-F nodes include central processing units (CPUs) or CPU Clusters, as shown in the drawings described herein; digital signal processor (DSP), and graphical processing units (GPUs). Examples of RN-I nodes include direct memory access (DMA) nodes; PCI-E busses; network engines; network interface controllers (NICs); and microcontrollers (MCUs).

Receiver partitions in a CCN may be target or receiver device partitions. Receiver partition may have associated storage, such as system cache, and snoop filters, this is not a requirement. While a receiver does not always contain a cache, it will always be a point of coherence in the CCN. Accordingly, as receivers of transaction requests from one or more senders, HN partitions may serve as Points of Coherence/Point of Serialization (POC/POS) that can detect memory addresses associated with their respective shared cache memory and dynamically allocate processing resources needed to handle received transaction requests. Accordingly, HN partitions are in communication via the interconnect with RNs; they receive transaction requests from one or more RNs and send back completion messages upon completion of the requests. With the CCN, a HN partition may be fully coherent HN, denoted as HN-F. However, it is understood that reference to a HN partition or a HN-F cache partition encompasses various types of memory partitions, of which HN-F is but one particular type. Grouped HN partitions can together make up a cache. Moreover, two groups of HN partitions can represent two independent caches.

Cache memory may be any suitable storage technology such as a random access memory (RAM), Read Only Memory (ROM), Flash memory, Electrically Erasable Programmable Read Only Memory (EEPROM), mass storage such as a hard disc drive, floppy disc drive, optical disc drive or may accommodate other electronic storage media, and non-volatile memory (NVM). The memory may be active memory or may permanently reside in ROM, EEPROM or Flash memory, for example.

As shown in FIG. 1, HN partitions, shown as Home Nodes 130 (HNs 130), are in communication via coherent interconnect 120 with RNs, shown here as CPU clusters 190 in this example. CPU clusters 190 may include a plurality of processor cores and a shared local cache memory. HNs 130 receive transaction requests from one or more of the CPU clusters 190 over coherent interconnect 120 and send back completion messages upon completion of the requests. As previously discussed, a HN partition, such as HN 130, may be fully coherent HN, denoted as HN-F. However, it is understood that reference to a HN partition or a HN-F cache partition encompasses various types of memory partitions, of which HN-F is but one particular type.

A power control element, such as power control block (PCB) 140, which may also control one or more clocks of the system, is coupled to the one or more addressable receiver partitions HNs 130, coherent interconnect 120 and interrupt controller 150 as shown and is operable to selectively control transition from a current power state to a new power state by receiver partitions of one or more partition groups. Coherent interconnect 120 provides a hardware interface between the processors CPU clusters 190 and a controller, like MCU 160, in order to provide full cache coherency between clusters of multi-core CPU clusters 190. Coherent interconnect 120 may further provide IO coherency for other devices, such as peripherals and network interfaces.

A CCN implemented as a SOC may include a system control processor to manage power control, as well as configuration and other tasks. The system control processor may be any IO coherent RN node that sends a memory request, such as a system control microcontroller unit (MCU), such as MCU 160 shown here, or a power MCU or a CPU. The MCU software is also aware of the NUMA regions associated with various HN partition groups since it will most likely be involved in the system address map (SAM) configuration.

Interrupt controller 150 handles all interrupts in a typical system and is responsive to interrupt signals 145 received via PCB 140. Interrupts 155 generated by interrupt controller 150 may be responsive to various interrupt sources in the system, such as from one or more HNs 130, CUP clusters 190 or peripherals of the system, that are communicated to interrupt controller 150 by PCB 140.

Certain CCN interconnects seek to implement hardware interfaces to control the power domains of all HN-F partitions globally. This global approach may not feasible or optimal, however, for groupings of HN-Fs partitions in memory access partition groups, or NUMA regions, since each NUMA group may have its own power domain requirements. Further, global hardware control of memory access partition groups may become unmanageable at the SOC level, where the number of HN-F partitions for some architectures can be as high as 32.

In a CCN network as described herein, HN-F partitions may be grouped into partition groups, which can be configured in software at power-up. Each partition group will have a different range of addresses with the particular HN-F partitions of that partition group, and different partition groups may be used for different logical purposes. For example, different partition groups may support different operating systems (OSs) in a divided OS approach. Different partition groups may support workloads or tasks having different caching requirements; for example, one memory address region associated with a particular partition group may require the full system-level cache (SLC) capacity based on the system workload, while another partition group may not require any cache at all to carry out its assigned tasks. Separate workloads running in different HN-F partitions may have quite different bandwidth or capacity requirements. A partition group of HN-F partitions may be powered down, for example, if the workload for the NUMA region associated with the partition group does not require or make use of the bandwidth or cache capacities provided by the partition group.

In the particular example shown in FIG. 1, for example, there are two different configurations of partition groups: partition groups 170 and partition groups 180. There are four different partition groups 170 each with their own power domain. Each partition group 170 is shown in this particular example as a row having four HNs 130. Another configuration of partition is illustrated by two partition groups 180, each comprised of two columns of HNs 130 for a total of eight HNs 130 per partition group 180. Each partition group 180 has its own power domain. Again, reference to a HN partition includes a fully coherent HN partition, or HN-F. However, it is understood that reference to a HN partition or a HN-F cache partition encompasses various types of memory partitions, of which HN-F is but one particular type.

As described herein, various embodiments provide for dynamic and flexible control of the power state of HN-F partitions of the network and/or the power state of partition HN-F groups. Filtered interrupt generation responsive to power state transition completion by HN-Fs is one approach in which to communicate power state transition of HN-F partitions by partition group or for all HN-F partitions in the CCN. The MCU software can manage power states across NUMA regions (partition groups) responsive to a desire to change the power state of HN-F partitions of one or more partition groups.

Figure 2:
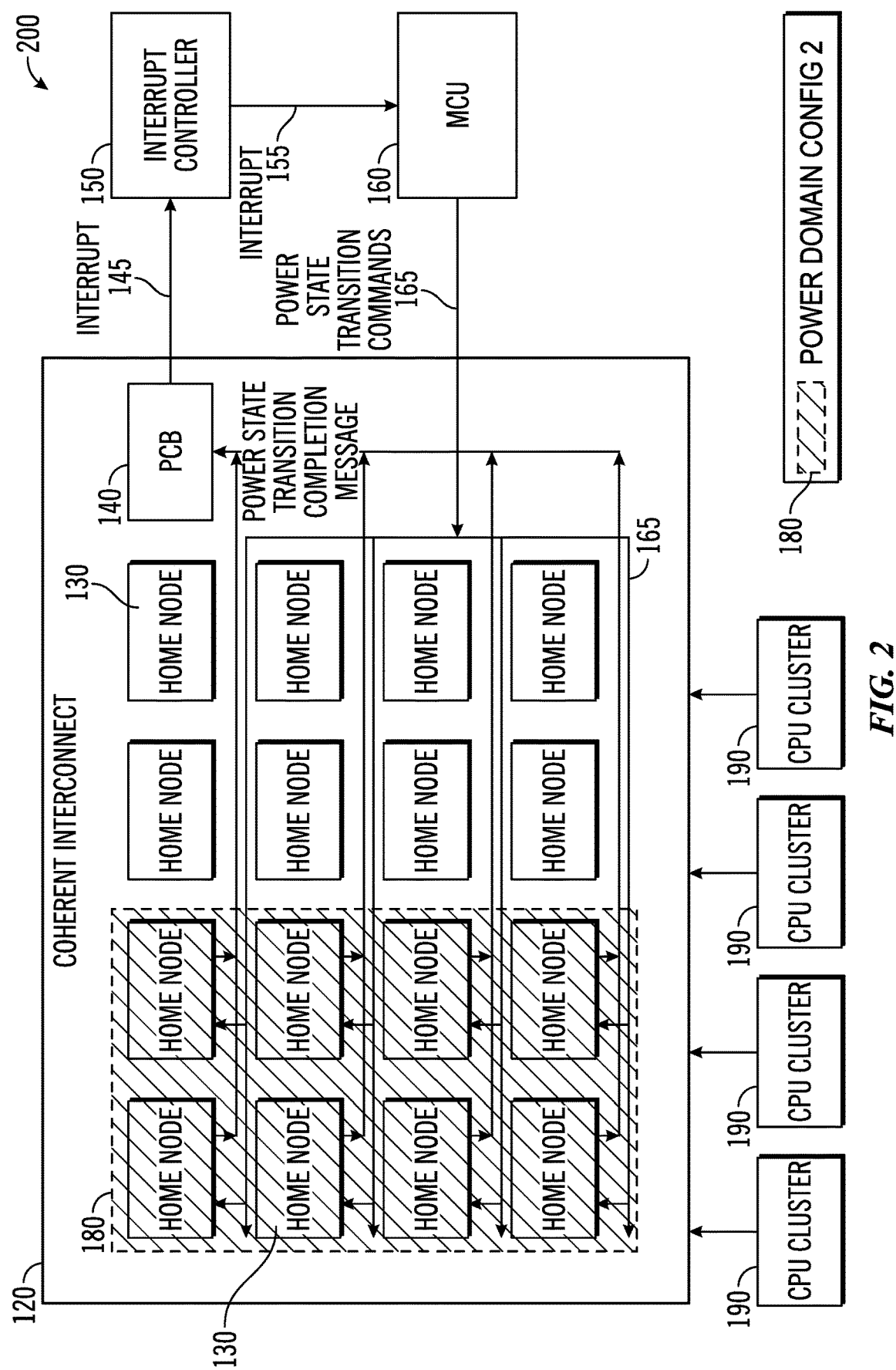
FIG. 2 is a block diagram of a distributed cache system, further in accordance with various representative embodiments.
Figure 3:
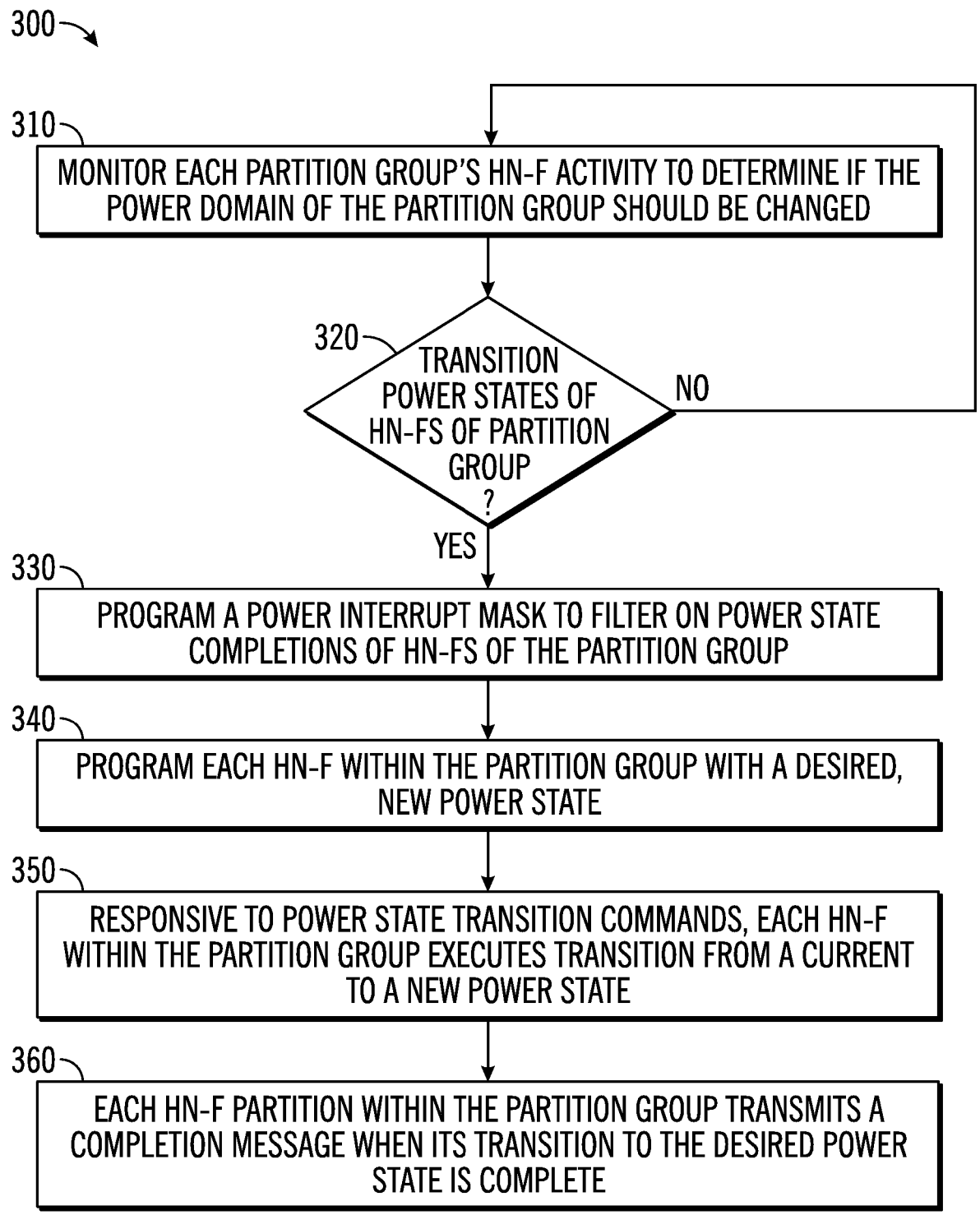
FIG. 3 is a flowchart that illustrates a method of power state control in a distributed cache system, in accordance with various representative embodiments.

Referring now to flowchart 300 of FIG. 3, a method for controlling power states of segregated receiver device partition groups is illustrated. The MCU software at Block 310 may monitor activity parameters of each partition group's HN-F activity in the network via performance counters. For example, monitoring activity or performance parameters of a HN-F partition may include monitoring the number of cache accesses over time by the HN-Fs of a partition group or the HN-F cache hit rate associated with HN-Fs of a partition group, or polling a power status register of a HN-F partition to make this determination. If it becomes needed or desired to change the power state of the HN-F partitions of a partition group, as determined at Decision Block 320, the MCU programs and thereby causes a power interrupt mask of the CCN to filter on power state completions for HN-Fs in the target partition group of interest at Block 330; this may be HN-F's for all of partition groups 170 and 180 as indicated in FIG. 1 or it may be only for the HN-Fs of partition group 180, as shown in cache coherent network 200 of FIG. 2.

At Block 340, the MCU provides the desired power state for each HN-F partition, such as by programming a power state register of each HN-F partition within the partition group with the functional power state required for each HN-F partition. In this sense, the MCU provides a power state indicator that indicates a desired, new power state for each HN-F partition of a partition group. At Block 350, each HN-F partition within the target partition group executes the functional power state transition, going from a current power state to a new power state in accordance with its power state register, in response to receipt of a power state transition command from the MCU. Execution of the received power state transition command by a HN-F may include flushing its associated HN-F cache, and putting the system level cache and random access memories (RAMs) associated with a particular HN-F partition into the new, required power state. As indicated in FIG. 1, at Block 360 each targeted HN-F sends a power state transition completion message via power control block PCB 140 to the global power interrupt logic, interrupt controller 150, upon completion of the power state transition. After the power state transitions of all affected HN-F partitions in the partition group are complete, power interrupt 155 is asserted by interrupt controller 150 to communicate to the MCU that the power state transitions are complete. This is indicated in FIGS. 1 and 2.

In accordance with certain embodiments, a HN-F interrupt mask and status register for the HN partitions of one or more partition groups may reside in the PCB 140. The interrupt mask may be set by software for each of the HN-Fs 130 in the corresponding power domain of the one or more partition groups. As shown in FIG. 1, a HN-F 130 sends a power state transition completion message to the power control block 140 upon completion of transitioning from a current to a new power state. PCB 140 may then set the status register bit for that HN-F in the PCB status register. The interrupt signal 145 asserts (is generated) once all of the masked HN-F completion bits in the status register for the partition groups of interest are set. If the system requires a power state transition in multiple power domains, the MCU sets the mask bits for the HN-Fs in all of the transitioning domains. In this case, Interrupt signal 145 is asserts after all Home Nodes in the multiple domains have completed their power state transitions.

Global, hardware interface control of power states across all HN-F partitions, regardless of partition grouping of the HN-F partitions, is also envisioned. In addition to software control of the HN-F power domains, there is the ability to send power transition requests or messages to all HN-F partitions at the de-assertion of reset, based on external hardware configuration, or through control signaling using a request/acknowledge signal interface as will be described. These requests are sent by PCB 140 to all HN-F partitions. This approach reduces or removes software requirements and complexity for SOCs that do not require any of the HN-F power domain functionality. HN-F partitions can reset directly into the full HN-F operation state.

Figure 4:
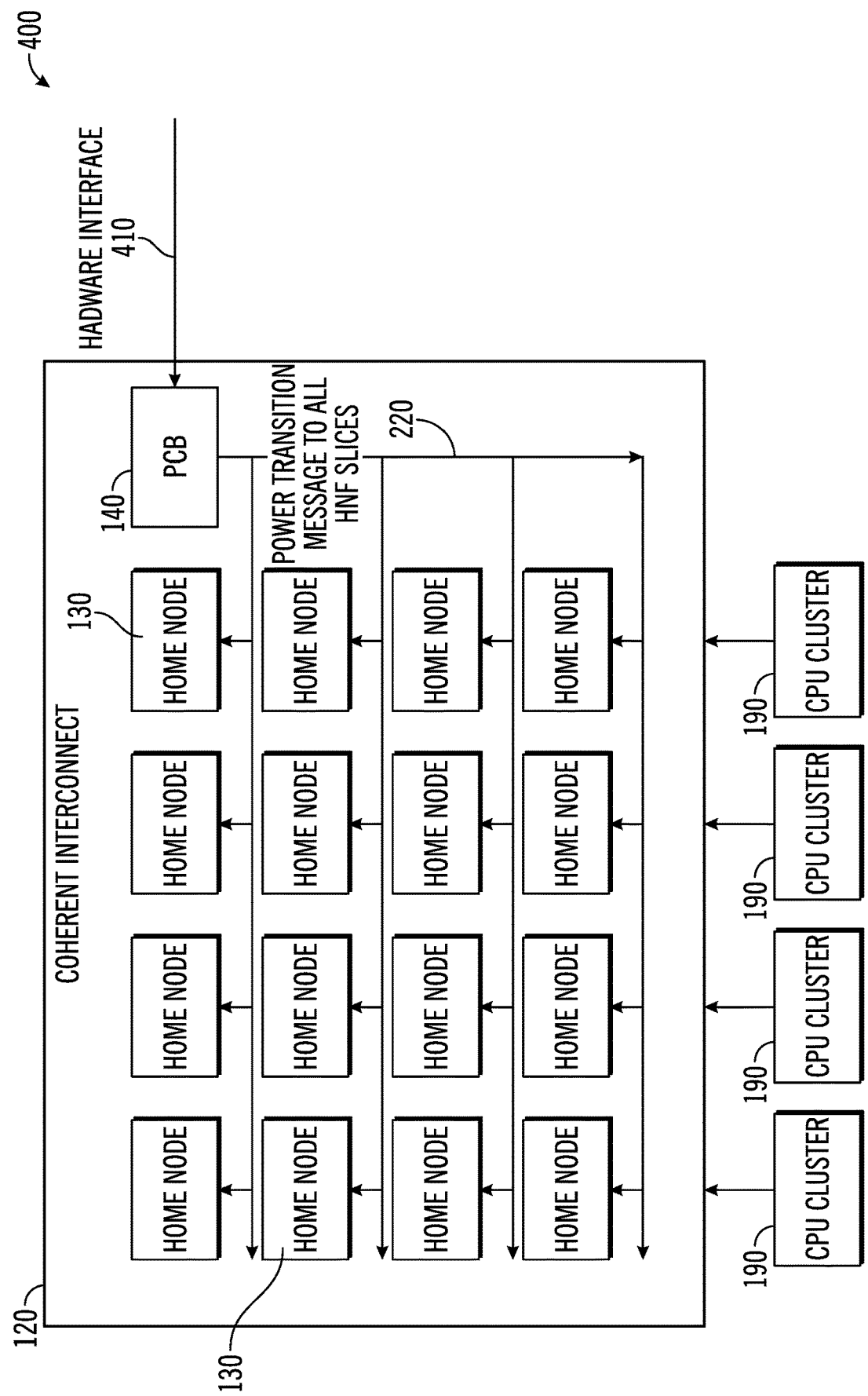
FIG. 4 is a block diagram of a distributed cache system in which hardware may be used to directly control receiver device power states, in accordance with various representative embodiments.

PCB 140 allows for hardware-initiated state change, regardless of partition grouping of the HN-F partitions. Referring now to cache coherent network 400 of FIG. 4, at the de-assertion of reset or request/acknowledge signaling of the system, power transition requests (messages) are sent over hardware interface 410 to PCB 140 as shown. PCB 140 transmits the received power transition requests to all HN-F partitions 130, regardless of grouping, or not, within partition groups. The individual HN-F partitions 130 change their power state in accordance with a received power transition message received from PCB 140. One example implementation of the hardware-initiated state changes would be a request/acknowledge signal interface between SoC power control logic and the PCB. The SoC requests the PCB to transition to a full operation power state. The PCB then sends messages to all HN-F partitions to fully enable their cache and snoop filter logic. Each HN-F partition send a completion message to the PCB when the transition is complete, and the PCB asserts an acknowledge back to the SoC after all HN-F partitions have completed the transitions.

Figure 5:
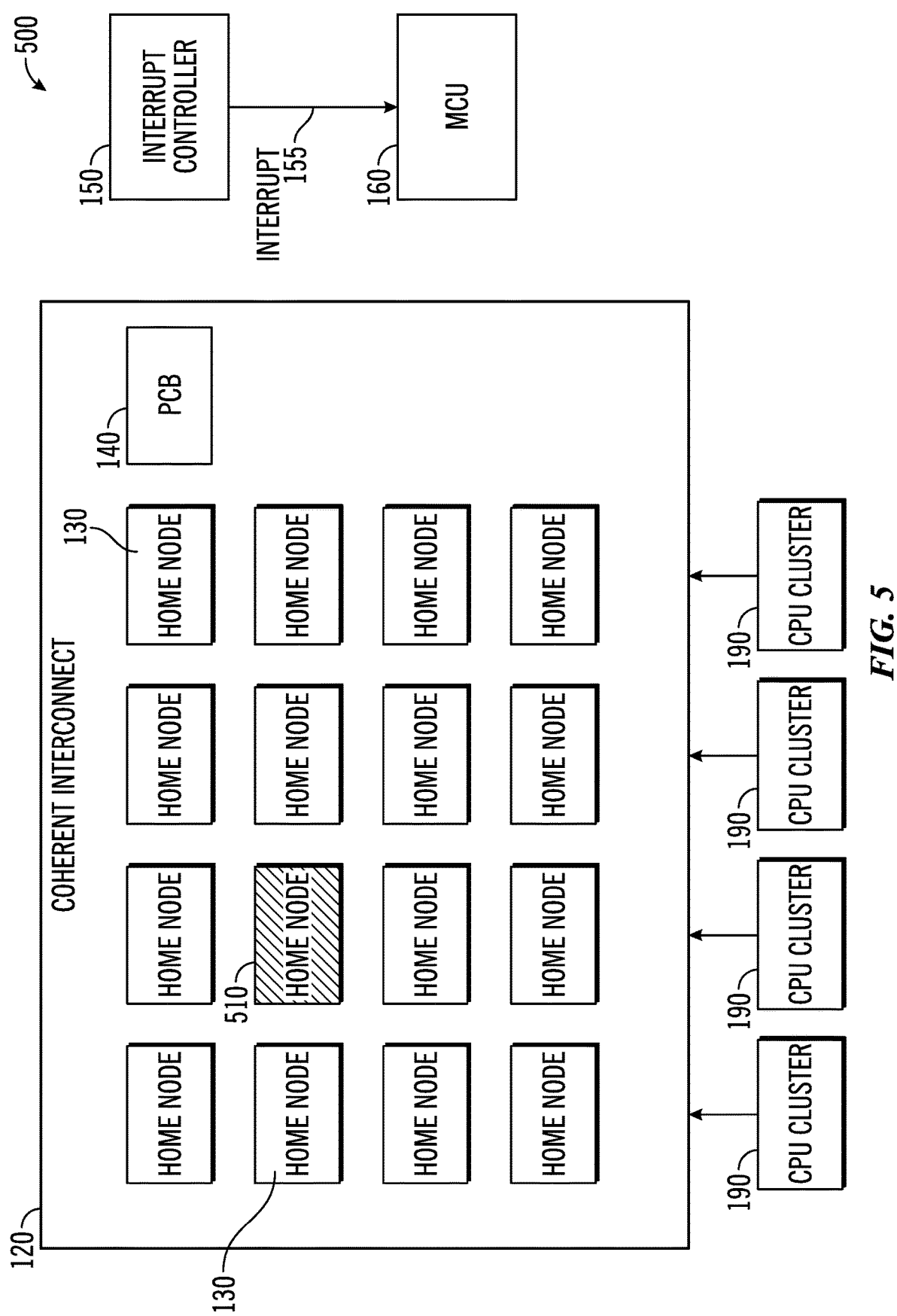
FIG. 5 is a block diagram of a distributed cache system in which a receiver device initiates a dynamic retention power transition internally, in accordance with various representative embodiments.

In accordance with a further example embodiment, the power state of one or more HN-F partitions may be controlled by the respective HN-F partition itself. No input is needed or required external to the HN-F partition to control and execution power state transition from a current to a new power state. Thus, unlike the embodiments previously discussed, no input from either PCB 140 or MCU 160, such as external power state transition commands, is needed. The processor of the HN-F partition itself behaves as the power control element and controls execution from the current to the new power state. In the example of FIG. 5, then, home node 510 itself initiates a dynamic power retention transition internally, with no input, such as power state transition commands, from either PCB 140 or MCU 150. One example of an internally generated power transition is dynamic retention triggered by HN-F partition inactivity. The HN-F partition can implement a counter to track the number of inactive cycles, and trigger a dynamic retention state when a threshold is reached. The dynamic retention state puts the HN-F cache RAMs in a low power state in which the cache data is retained, but cannot be accessed. The HN-F partition exits the dynamic retention state when activity occurs that requires the HN-F partition functionality.

As used herein, a power state or power states of a receiver device can vary considerably and may differ depending on the modes of the respective receiver device. For instance, there may be power states associated with shutdown of a receiver device, power states associated with operational modes of a receiver device, and still other power states associated with dynamic retention modes of a receiver device. For example, if the receiver device is a cache memory, it may have different functional power states with different levels of capacity (for example, a reduced number of cache ways), and different levels of retention states for the cache RAMs.

As used herein, the term processor, controller or the like may encompass a processor, controller, microcontroller unit (MCU), microprocessor, and other suitable control elements. It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Therefore, in accordance with various embodiments described herein, a cache coherent network has: a plurality of addressable receiver partitions arranged in a plurality of partition groups, with each receiver partition having associated storage and a processor and with each partition group having a power domain; a coherent interconnect; a plurality of senders configured to transmit a plurality of transaction requests to the plurality of receiver partitions over the coherent interconnect; and a power control element coupled to one or more of the addressable receiver partitions and the coherent interconnect and operable to selectively control transition from a current power state to a new power state by each receiver partition of one or more partition groups of the plurality of partition groups.

In accordance with certain embodiments of the present disclosure, there is provided a method of dynamically controlling power states in a cache coherent network, comprising: arranging a plurality of addressable receiver partitions in one or more partition groups, each partition group having a power domain; responsive to a plurality of power state transition commands received by the plurality of addressable receiver partitions of the one or more partition groups, each receiver partition of the one or more partition groups executing a received power state transition command to transition from a current power state to a new power state of a plurality of power states; and each receiver partition of the one or more partition groups transmitting a power state transition completion message when transition from the current power state to the new power state by the receiver partition is complete.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Accordingly, some aspects and features of the disclosed embodiments are set out in the following numbered items:
1. A cache coherent network, comprising:
a plurality of addressable receiver partitions arranged in a plurality of partition groups, with each receiver partition having associated storage and a processor and with each partition group having a power domain;
a coherent interconnect;
a plurality of senders configured to transmit a plurality of transaction requests to the plurality of receiver partitions over the coherent interconnect; and
a power control element coupled to one or more of the addressable receiver partitions and the coherent interconnect and operable to selectively control transition from a current power state to a new power state by each receiver partition of one or more partition groups of the plurality of partition groups.

2. The network of item 1, where arrangement of the plurality of receiver partitions in the plurality of partition groups is configurable.

3. The network of item 1, where the plurality of receiver partitions are home node partitions arranged in a plurality of home node partition groups and the plurality of senders are request nodes, with each home node partition operable as a point of coherence/point of serialization for requests received from one or more of the plurality of request nodes.

4. The network of item 1, where the processor of a receiver partition is the power control element and controls transition by the receiver partition from the current power state to the new power state.

5. The network of item 5, where the receiver partition does not receive a power state transition command.

6. The network of item 1, where responsive to receiving a plurality of power state transition commands the power control element instructs the receiver partitions irrespective of arrangement in the plurality of partition groups to execute transition of power state from a current power state to a new power state.

7. The network of item 1, further comprising a power state register coupled to each receiver partition and an interrupt mask coupled to the power control element, where the power control element is operable to store within the power state register the new power state for each receiver partition of the one or more partition groups and the power control element is operable to cause the interrupt mask to filter on power state transition completions received from the plurality of receiver partitions.

8. The network of item 7, where each of the receiver partitions of the one or more partition groups transmits a power state transition completion message after execution by the receiver partition of a transition from the current power state to a new power state and upon transmission of power state transition completion messages by the receiver partitions of the one or more partition groups the power control element asserts an interrupt signal that is received by an interrupt controller of the cache coherent network.

9. The network of item 8, where the power control element updates a status register bit associated with a receiver partition in response to receipt of a power state transition completion message transmitted by the receiver partition.

10. A method of dynamically controlling power states in a cache coherent network, comprising:
arranging a plurality of addressable receiver partitions in one or more partition groups, each partition group having a power domain;
responsive to a plurality of power state transition commands received by the plurality of addressable receiver partitions of the one or more partition groups, each receiver partition of the one or more partition groups executing a received power state transition command to transition from a current power state to a new power state of a plurality of power states; and
each receiver partition of the one or more partition groups transmitting a power state transition completion message when transition from the current power state to the new power state by the receiver partition is complete.

11. The method of item 10, further comprising causing a power interrupt mask of a power control element of the cache coherent network to filter on power state transition completions by each receiver partition from the current power state to the new power state.

12. The method of item 10, further comprising a power control element of the cache coherent network providing to each receiver partition the new power state.

13. The method of item 10, further comprising a processor of a receiver partition of the plurality of receiver partitions controlling transition by the receiver partition from the current power state to the new power state, where no power state transition command is received by the receiver partition.

14. The method of item 10, further comprising asserting an interrupt signal once all receiver partitions of the one or more partition groups have completed power state transition from the current state to the new state.

15. The method of item 10, further comprising updating a status register bit associated with a receiver partition responsive to receiving a power state transition completion message from the receiver partition.

16. The method of item 10, where the new power state of the plurality of power states for first and second receiver partitions is different.

17. The method of item 10, further comprising:
responsive to receiving via a hardware interface of the cache coherent network a second plurality of power state transition commands, a power control element of the cache coherent network transmitting to each addressable receiver partition in the one or more partition groups the plurality of power state transition commands.

18. The method of item 10, further comprising monitoring one or more activity parameters of the plurality of receiver partitions of one or more of the plurality of partition groups to determine when to transition the power state of each of the plurality of receiver partitions of the one or more partition groups.

19. The method of item 10, further comprising:
reconfiguring the one or more partition groups by changing the arrangement of the plurality of addressable receiver partitions in the one or more partition groups.

20. The method of item 10, further comprising:
each receiver partition of the one or more partition groups flushing storage associated with the receiver partition responsive to the received power state transition command to transition from the current power state to the new power state.

21. The method of item 10, further comprising storing within a power state register of each receiver partition the new power state.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:
1. A cache coherent network, comprising:
a plurality of senders configured to transmit a plurality of transaction requests, each sender being a request node;
a coherent interconnect coupled to the plurality of senders;
a plurality of addressable receiver partitions, coupled to the coherent interconnect, configured to receive the plurality of transaction requests, each addressable receiver partition being arranged in a plurality of reconfigurable partition groups, each addressable receiver partition having associated storage and a processor, where the addressable receiver partitions are home node partitions and the reconfigurable partition groups are home node partition groups;
an interrupt mask; and
a power control element, coupled to the coherent interconnect and the interrupt mask, operable to selectively control transition from a current power state to a new power state for the addressable receiver partitions in each reconfigurable partition group, and operable to cause the interrupt mask to filter on power state transition completions received from the plurality of addressable receiver partitions.

2. The cache coherent network of claim 1, where each home node partition is operable as a point of coherence/point of serialization for transaction requests received from one or more of the plurality of request nodes, the transaction requests including at least one of a memory read request, a memory write request, or a memory-mapped device access request.

3. The cache coherent network of claim 1, where the processor of an addressable receiver partition is configured to control the transition of the addressable receiver partition from the current power state to the new power state.

4. The cache coherent network of claim 3, where the addressable receiver partition does not receive a power state transition command.

5. The cache coherent network of claim 1, where, responsive to receiving a plurality of power state transition commands, the power control element instructs the addressable receiver partitions, irrespective of arrangement in the plurality of reconfigurable partition groups, to execute transition from a current power state to a new power state.

6. The cache coherent network of claim 1, further comprising:
a power state register coupled to each addressable receiver partition,
where the power control element is operable to store within the power state register the new power state for each addressable receiver partition of the one or more reconfigurable partition groups.

7. The network of claim 6, where each of the addressable receiver partitions of the one or more reconfigurable partition groups transmits a power state transition completion message after execution by the addressable receiver partition of a transition from the current power state to a new power state and upon transmission of power state transition completion messages by the addressable receiver partitions of the one or more reconfigurable partition groups the power control element asserts an interrupt signal that is received by an interrupt controller of the cache coherent network.

8. The cache coherent network of claim 7, where the power control element updates a status register bit associated with an addressable receiver partition in response to receipt of a power state transition completion message transmitted by the addressable receiver partition.

9. A method of dynamically controlling power states in a cache coherent network, comprising:
arranging a plurality of addressable receiver partitions in one or more reconfigurable partition groups, where the addressable receiver partitions are home node partitions and the reconfigurable partition groups are home node partition groups;
responsive to a plurality of power state transition commands received by the plurality of addressable receiver partitions of the one or more reconfigurable partition groups, each addressable receiver partition of the one or more reconfigurable partition groups executing a received power state transition command to transition from a current power state to a new power state of a plurality of power states;
transmitting, by each addressable receiver partition of the one or more reconfigurable partition groups, a power state transition completion message when transition from the current power state to the new power state by the addressable receiver partition is complete; and
causing a power interrupt mask of a power control element of the cache coherent network to filter on power state transition completions by each addressable receiver partition from the current power state to the new power state.

10. The method of claim 9, further comprising a power control element of the cache coherent network providing to each addressable receiver partition the new power state.

11. The method of claim 9, further comprising a processor of an addressable receiver partition of the plurality of addressable receiver partitions controlling transition by the addressable receiver partition from the current power state to the new power state, where no power state transition command is received by the addressable receiver partition.

12. The method of claim 9, further comprising asserting an interrupt signal once all addressable receiver partitions of the one or more reconfigurable partition groups have completed power state transition from the current power state to the new power state.

13. The method of claim 9, further comprising updating a status register bit associated with an addressable receiver partition responsive to receiving a power state transition completion message from the addressable receiver partition.

14. The method of claim 9, where the new power state of the plurality of power states for first and second addressable receiver partitions is different.

15. The method of claim 9, further comprising:
responsive to receiving via a hardware interface of the cache coherent network a second plurality of power state transition commands, a power control element of the cache coherent network transmitting to each addressable receiver partition in the one or more reconfigurable partition groups the plurality of power state transition commands.

16. The method of claim 9, further comprising monitoring one or more activity parameters of the plurality of addressable receiver partitions of one or more of the reconfigurable partition groups to determine when to transition the power state of each of the plurality of addressable receiver partitions of the one or more reconfigurable partition groups.

17. The method of claim 9, further comprising:
reconfiguring the one or more reconfigurable partition groups by changing the arrangement of the plurality of addressable receiver partitions in the one or more reconfigurable partition groups.

18. The method of claim 9, further comprising:
for each addressable receiver partition of the one or more reconfigurable partition groups, flushing storage associated with the addressable receiver partition responsive to the received power state transition command to transition from the current power state to the new power state.

19. The method of claim 9, further comprising storing within a power state register of each addressable receiver partition the new power state.

* * * * *